United States Patent
Koul et al.

(10) Patent No.: US 10,666,675 B1
(45) Date of Patent: May 26, 2020

(54) SYSTEMS AND METHODS FOR CREATING AUTOMATIC COMPUTER-GENERATED CLASSIFICATIONS

(71) Applicant: CA, INC., San Jose, CA (US)

(72) Inventors: Nikhita Koul, San Jose, CA (US); Gyan Ranjan, Santa Clara, CA (US)

(73) Assignee: CA, Inc., San Jose, CA (US)

( * ) Notice: Subject to any disclaimer, the term of this patent is extended or adjusted under 35 U.S.C. 154(b) by 38 days.

(21) Appl. No.: 15/276,825

(22) Filed: Sep. 27, 2016

(51) Int. Cl.
*H04L 29/06* (2006.01)
*G06F 16/35* (2019.01)

(52) U.S. Cl.
CPC ........ *H04L 63/1433* (2013.01); *G06F 16/355* (2019.01); *H04L 63/1425* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 7,644,150 B1 | 1/2010 | Nucci et al. | |
| 7,864,764 B1 | 1/2011 | Ma et al. | |
| 7,971,054 B1 | 6/2011 | Boisjolie et al. | |
| 8,087,088 B1 * | 12/2011 | Pennington | G06F 11/3692 709/206 |
| 8,291,495 B1 | 10/2012 | Burns et al. | |
| 8,494,985 B1 | 7/2013 | Keralapura et al. | |
| 8,578,024 B1 | 11/2013 | Keralapura et al. | |
| 8,631,498 B1 | 1/2014 | Hart et al. | |
| 8,683,584 B1 * | 3/2014 | Daswani | G06F 21/577 726/22 |
| 8,776,168 B1 | 7/2014 | Gibson et al. | |

(Continued)

FOREIGN PATENT DOCUMENTS

| | | |
|---|---|---|
| CN | 108886512 A | 11/2018 |
| CN | 109154962 A | 1/2019 |

(Continued)

OTHER PUBLICATIONS

Hongyi Yao et al: "Samples: Self Adaptive Mining of Persistent LExical Snippets for Classifying Mobile Application Traffic", Proceedings of the 21st Annual International Conference on Mobile Computing and Networking, MOBICOM '15, Jan. 1, 2015, pp. 439-451, XP055364474, New York, New York, USA, DOI: 10.1145/2789168.2790097, ISBN: 978-1-4503-3619-2.

(Continued)

*Primary Examiner* — Joseph P Hirl
*Assistant Examiner* — Hassan Saadoun
(74) *Attorney, Agent, or Firm* — FisherBroyles, LLP (57) ABSTRACT

The disclosed computer-implemented method for creating automatic computer-generated classifications may include (i) mining webpages of entities with a known classification, (ii) using information mined from the webpages to create a classification structure that assigns class labels to entities based on entity webpage content, (iii) applying, to the classification structure, one or more webpages of a new entity with an unknown classification, (iv) receiving, from the classification structure, a class label for the new entity, and (v) performing a security action based on the new entity's class label. Various other methods, systems, and computer-readable media are also disclosed.

20 Claims, 6 Drawing Sheets

(56) References Cited

U.S. PATENT DOCUMENTS

| | | | |
|---|---|---|---|
| 8,819,227 | B1 | 8/2014 | Keralapura et al. |
| 8,843,267 | B2 | 9/2014 | Park et al. |
| 8,843,627 | B1 | 9/2014 | Baldi et al. |
| 9,282,109 | B1 | 3/2016 | Aziz et al. |
| 9,727,371 | B2 | 8/2017 | Johnson et al. |
| 2003/0105976 | A1 | 6/2003 | Copeland, III |
| 2008/0010683 | A1* | 1/2008 | Baddour ............ G06F 17/30864 726/24 |
| 2009/0012760 | A1 | 1/2009 | Schunemann |
| 2009/0119275 | A1 | 5/2009 | Chen et al. |
| 2010/0077161 | A1 | 3/2010 | Stoakes et al. |
| 2010/0095367 | A1 | 4/2010 | Narayanaswamy |
| 2010/0211796 | A1 | 8/2010 | Gailey et al. |
| 2011/0004504 | A1 | 1/2011 | Ives et al. |
| 2011/0022537 | A1 | 1/2011 | Nickerson et al. |
| 2011/0066648 | A1 | 3/2011 | Abhyanker et al. |
| 2011/0078157 | A1 | 3/2011 | Sun et al. |
| 2012/0239667 | A1 | 9/2012 | Vysyaraju et al. |
| 2012/0290330 | A1* | 11/2012 | Coleman ................ G06Q 40/00 705/4 |
| 2013/0046826 | A1 | 2/2013 | Stanton |
| 2013/0091217 | A1 | 4/2013 | Schneider |
| 2014/0052753 | A1 | 2/2014 | Zhang et al. |
| 2014/0058915 | A1 | 2/2014 | Hinesley et al. |
| 2014/0075004 | A1 | 3/2014 | Van Dusen et al. |
| 2014/0129678 | A1 | 5/2014 | Herman |
| 2014/0172495 | A1* | 6/2014 | Schneck ............ G06Q 10/0635 705/7.28 |
| 2014/0172766 | A1 | 6/2014 | Van Lunteren |
| 2014/0195518 | A1 | 7/2014 | Kelsey et al. |
| 2014/0282493 | A1 | 9/2014 | Glover et al. |
| 2014/0321290 | A1 | 10/2014 | Jin et al. |
| 2015/0081713 | A1 | 3/2015 | Alonso et al. |
| 2015/0156183 | A1 | 6/2015 | Beyer et al. |
| 2015/0381649 | A1 | 12/2015 | Schultz et al. |
| 2016/0094427 | A1 | 3/2016 | Talat et al. |
| 2016/0110819 | A1 | 4/2016 | Abramowitz |
| 2016/0173520 | A1 | 6/2016 | Foster et al. |
| 2016/0191348 | A1 | 6/2016 | Lee et al. |
| 2016/0191548 | A1 | 6/2016 | Smith et al. |
| 2016/0321452 | A1 | 11/2016 | Richardson et al. |
| 2016/0352805 | A1 | 12/2016 | Seida |
| 2017/0171906 | A1 | 6/2017 | Backholm et al. |
| 2017/0262522 | A1 | 9/2017 | Ranjan et al. |
| 2017/0286690 | A1 | 10/2017 | Chari et al. |
| 2017/0331840 | A1 | 11/2017 | Ranjan |
| 2018/0018327 | A1 | 1/2018 | Fleischman et al. |
| 2018/0047071 | A1 | 2/2018 | Hsu et al. |

FOREIGN PATENT DOCUMENTS

| | | |
|---|---|---|
| EP | 3 427 460 A1 | 1/2019 |
| JP | 2015-5274 A | 1/2015 |
| WO | 2015/094417 A1 | 6/2015 |
| WO | 2015/141560 A1 | 9/2015 |
| WO | 2017/155592 A1 | 9/2017 |
| WO | 2017/196463 A1 | 11/2017 |

OTHER PUBLICATIONS

Shuaifu Dai et al: "NetworkProfiler: Towards automatic fingerprinting of Android apps", INFOCOM, 2013 Proceedings IEEE, IEEE, Apr. 14, 2013, pp. 809-817, XP032440827, DOI: 10.1109/INFCOM. 2013.6566868, ISBN: 978-1-4673-5944-3.
Qiang Xu et al: "Automatic generation of mobile app signatures from traffic observations", 2015 IEEE Conference on Computer Communications (INFOCOM), Apr. 1, 2015 (Apr. 1, 2015), pp. 1481-1489, XP055364768, DOI: 10.1109/INFOCOM.2015.7218526 ISBN: 978-1-4799-8381-0.
Saurabh S. Kataria, et al.; Entity Disambiguation with Hierarchical Topic Models; Aug. 21, 2011.
Andrew M. Dai, et al.; The Grouped Author—Topic Model for Unsupervised Entity Resolution; 2011.
Topic Model; https://en.wikipedia.org/wiki/Topic_model; as accessed on Dec. 14, 2016; Nov. 13, 2010.
David Newman et. al; Statistical Entity—Topic Models; SIG KDD 2006; Aug. 20, 2006.
Corporate Reputation; https://www.meaningcloud.com/products/corporate-reputation; as accessed on Dec. 15, 2016; May 1, 2015.
Gyan Ranjan; Systems and Methods for Collecting Organization-Specific Media Events; U.S. Appl. No. 15/151,688, filed May 11, 2016.
Gyan Ranjan; Systems and Methods for Automatically Inferring Brand Reputation Following Potentially Damaging Epochs; U.S. Appl. No. 15/151,706, filed May 11, 2016.
Gyan Ranjan, et al; Systems and Methods for Automated Classification of Application Network Activity; U.S. Appl. No. 15/064,629, filed Mar. 9, 2016.
Hongyi Yao, et al.; Samples: Self Adaptive Mining of Persistent LExical Snippets for Classifying Mobile Application Traffic; https://www.sigmobile.org/mobicom/2015/papers/p439-yaoA.pdf; MobiCom'15; (Sep. 7-11, 2015).
Alshukri; A Framework for Brand Reputation Mining and Visualisation; http://link.springer.com/chapter/10.1007/978-3-319-12069-0_22, as accessed Mar. 21, 2016; Oct. 30, 2014.
Spangler; Cobra Mining Web for COrporate Brand and Reputation Analysis; https://www.researchgate.net/publication/220298401_COBRA_-_mining_web_for_COrporate_Brand_and_Reputation_Analysis, as accessed Mar. 21, 2016; Jan. 2009.
Alok Tongaonkar, et al.; Understanding Mobile App Usage Patterns Using In-App Advertisements; https://people.eecs.berkeley.edu/~dawnsong/papers/mobile%20app%20usage.pdf; PAM 2013, LNCS 7799; 2013.
Shuaifu Dai, et al; NetworkProfiler: Towards Automatic Fingerprinting of Android Apps; https://people.eecs.berkeley.edu/~dawnsong/papers/2013%20networkprofiler.pdf; IEEE INFOCOM 2013; 2013.
Alexander Ihler, et al.; Adaptive Event Detection with Time-Varying Poisson Processes; http://www.datalab.uci.edu/papers/event_detection_kdd06.pdf, as accessed Mar. 21, 2016; KDD 2006; 2006.
Wei Xu, et al.; Detecting Large-Scale System Problems by Mining Console Logs; https://pdfs.semanticscholar.org/0790/6bb4ff7dad272585ff4eea641ffb0107d545.pdf, as accessed Mar. 21, 2016 and http://dl.acm.org/citation.cfm?id=1629587, as accessed Mar. 21, 2016; Proceedings of the 26th International Conference on Machine Learning 2010 and Proceedings of the ACM SIGOPS 22nd Symposium on Operating Systems Principles 2009; 2009.
Ashish Patro, et al.; Capturing Mobile Experience in the Wild: A Tale of Two Apps; Presented at ACM Conext 2013; 2013.
Gyan Ranjan; Systems and Methods for Determining Security Risk Profiles; U.S. Appl. No. 15/151,734, filed May 11, 2016.
Gyan Ranjan, et al; Systems and Methods for Identifying Source Applications of Network Flows; U.S. Appl. No. 14/968,943, filed Dec. 15, 2015.
Narus (company); http://www.narus.com/, as accessed Oct. 15, 2015; May 8, 1999.
Stanislav Miskovic, et al.; AppPrint: Automatic Fingerprinting of Mobile Applications in Network Traffic; http://wan.poly.edu/pam2015/papers/3.pdf; Apr. 4, 2015.
Qiang Xu, et al; Automatic Generation of Mobile App Signatures from Traffic Observations; https://web.eecs.umich.edu/~zmao/Papers/infocom15-flowr.pdf; 2015.
Susanta K. Nanda, et al; Systems and Methods for Scalable Network Monitoring in Virtual Data Centers; U.S. Appl. No. 14/614,819, filed Feb. 5, 2015.
Daniel Marino, et al; Systems and Methods for Increasing Security on Computing Systems That Launch Application Containers; U.S. Appl. No. 14/697,016, filed Apr. 27, 2015.
Pang et al.; Thumbs up? Sentiment Classification Using Machine Learning Techniques, http://www.cs.cornell.edu/home/llee/papers/sentiment.home.html, as accessed Mar. 31, 2017, published in 2002.
Peter Turney; Thumbs up or Thumbs Down? Semantic Orientation Applied to Unsupervised Classification of Reviews; http://acl.arc.comp.nus.edu.sg/archives/acl-arc-090501d4/data/pdf/anthology-PDF/P/P02/P02-1053.pdf, as access on Mar. 31, 2017, published in 2002.

(56) References Cited

OTHER PUBLICATIONS

Hu et al.; Mining and Summarizing Customer Reviews; https://www.cs.uic.edu/~liub/publications/kdd04-revSummary.pdf, as accessed Mar. 31, 2017, published in 2004.
B. Liu et al.; Opinion Observer: Analyzing and Comparing Opinions on the Web; https://www.cs.uic.edu/~liub/publications/www05-p536.pdf, as accessed Mar. 31, 2017, published in 2005.
Melville et al.; Sentiment Analysis of Blogs by Comparing Lexical Knowledge with Text Classification; sites.google.com/site/premmelville/pooling-multinomials-kdd09.pdf, as accessed Mar. 31, 2017, published in 2009.
Vangie Beal; URI—Uniform Resource Locator; http://www.webopedia.com/TERM/U/URL.html, as accessed May 5, 2016.
Margaret Rouse; brand; http://whatis.techtarget.com/definition/brand, as accessed May 5, 2016.
International Search Report and Written Opinion received for International Patent Application Serial No. PCT/US2016/069025 dated Apr. 28, 2017, 9 pages.
International Preliminary Report on Patentability received for International Patent Application Serial No. PCT/US2016/069025 dated Sep. 20, 2018, 8 pages.
International Search Report and Written Opinion received for International Patent Application Serial No. PCT/US2017/026181 dated Jul. 28, 2017, 10 pages.
International Preliminary Report on Patentability received for International Patent Application Serial No. PCT/US2017/026181 dated Nov. 22, 2018, 9 pages.
Toshiba, "MAGNIA SG20 Instruction Manual", Second edition, Dec. 13, 2002, pp. 1-331.

\* cited by examiner

MCAFEE Information
400

****************************************

SIC CODE:
7372

WEBPAGES:
https://home.mcafee.com/; https://www.mcafee.com/consumer/en-us/store/m0/catalog.html?PIFId=-1&rfhs=1; https://home.mcafee.com/downloads/OneClickTrial.aspx?culture=en-us; https://twitter.com/McAfee?ref_src=twsrc%5Egoogle%7Ctwcamp%5Eserp%7Ctwgr%5Eauthor; http://www.pcmag.com/article2/0,2817,2469309,00.asp EXTRACTED WORDS:
Million, Service, Intel, NitroSecurity, Cloud, Devices, Server, Secure, Discontinuing, Endpoint, Software, Acquire, Protection, February, Appliance, Security, Encryption, Access, Spam, Stars, Discontinuing, Held, Reconnex, World, Logic, Gave, Against, SaaS, Computing, Products, Announced, Encryption, Safeboot, Firewall, Email, Viruses, Public

SYSTEMS AND METHODS FOR CREATING AUTOMATIC COMPUTER-GENERATED CLASSIFICATIONS

BACKGROUND

Computer security services may determine which security measures to implement for a particular company's computing devices based on the company's industry classification. Traditionally, these classifications are assigned manually. Larger companies may have been required to self-classify their industry (e.g., when filing with the Securities and Exchange Commission). However, such classifications may be overly general and rigid. Moreover, self-classified industry classifications may be difficult to obtain for new companies and small to mid-tier companies (e.g., companies that do not file with the Securities and Exchange Commission). The instant disclosure, therefore, identifies and addresses a need for systems and methods for creating automatic computer-generated classifications.

SUMMARY

As will be described in greater detail below, the instant disclosure describes various systems and methods for creating automatic computer-generated classifications. In one example, a computer-implemented method for creating automatic computer-generated classifications may include (i) mining webpages of entities with a known classification, (ii) using information mined from the webpages to create a classification structure that assigns class labels to entities based on entity webpage content, (iii) applying, to the classification structure, one or more webpages of a new entity with an unknown classification, (iv) receiving, from the classification structure, a class label for the new entity, and (v) performing a security action based on the new entity's class label.

In some examples, the computer-implemented method may further include attributing a characteristic to the new entity based on the new entity's class label. In one embodiment, performing the security action may include determining a risk level of the new entity based on the new entity's class label and/or performing at least one action to protect a device associated with the new entity against data loss. In some examples, determining the risk level of the new entity may include determining the risk level of the new entity based further on risk information for the entities with known classifications.

In one example, receiving the class label for the new entity may include receiving an industry classification. In one embodiment, the webpages of the entities with a known classification and the webpages of the new entity may represent webpages associated with an entity product, webpages associated with an entity service, and/or social media pages.

In one embodiment, the classification structure may rely on topic modeling to assign class labels to entities. In some examples, using information mined from the webpages to create the classification structure may include using textual semantics included within the webpages.

In some examples, receiving the new entity's class label from the classification structure may include receiving multiple class labels for the new entity from the classification structure. In these examples, the classification structure may assign the new entity with the multiple class labels using fuzzy classification.

In one embodiment, the computer-implemented method may further include (i) identifying a class label previously assigned to the new entity by the new entity and/or a third party and (ii) determining that the class label previously assigned to the new entity differs from the class label received from the classification structure. In this embodiment, the computer-implemented method may further include determining, based on the class label previously assigned to the new entity differing from the class label received from the classification structure, that the new entity changed industry sectors after receiving the previously assigned class label. In one example, determining that the new entity changed industry sectors may include automatically determining that the new entity changed industry sectors without obtaining information indicating that the new entity changed sectors from the new entity.

In one embodiment, a system for implementing the above-described method may include (i) a mining module, stored in memory, that mines webpages of entities with a known classification, (ii) an creation module, stored in memory, that uses information mined from the webpages to create a classification structure that assigns class labels to entities based on entity webpage content, (iii) an application module, stored in memory, that applies, to the classification structure, one or more webpages of a new entity with an unknown classification, (iv) a receiving module, stored in memory, that receives, from the classification structure, a class label for the new entity, (v) a security module, stored in memory, that performs a security action based on the new entity's class label, and (vi) at least one physical processor configured to execute the mining module, the creation module, the application module, the receiving module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) mine webpages of entities with a known classification, (ii) use information mined from the webpages to create a classification structure that assigns class labels to entities based on entity webpage content, (iii) apply, to the classification structure, one or more webpages of a new entity with an unknown classification, (iv) receive, from the classification structure, a class label for the new entity, and (v) perform a security action based on the new entity's class label.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for creating automatic computer-generated classifications. As will be explained in greater detail below, the present disclosure may provide an automated classification-based system and methodology for assigning a new company to an industry vertical based on textual semantics associated with the company from publicly available web pages. By assigning industry verticals to companies automatically, based on textual semantics from web pages, the disclosed systems and methods may eliminate reliance on third-party data sources for industry vertical classification, thereby improving the accuracy of industry classifications and decreasing the time required to obtain industry classifications.

In addition, the disclosed systems and methods may deduce risk profiles based on the automatically obtained industry classification information and perform security actions based on the deduced risk profiles. Thus, the systems and methods described herein may improve the functioning of a computing device by automatically anticipating and responding to risks of an entity's computing devices. These systems and methods may also improve the field of enterprise-level security by increasing the available information pertaining to an entity's risk profile.

Figure 1:
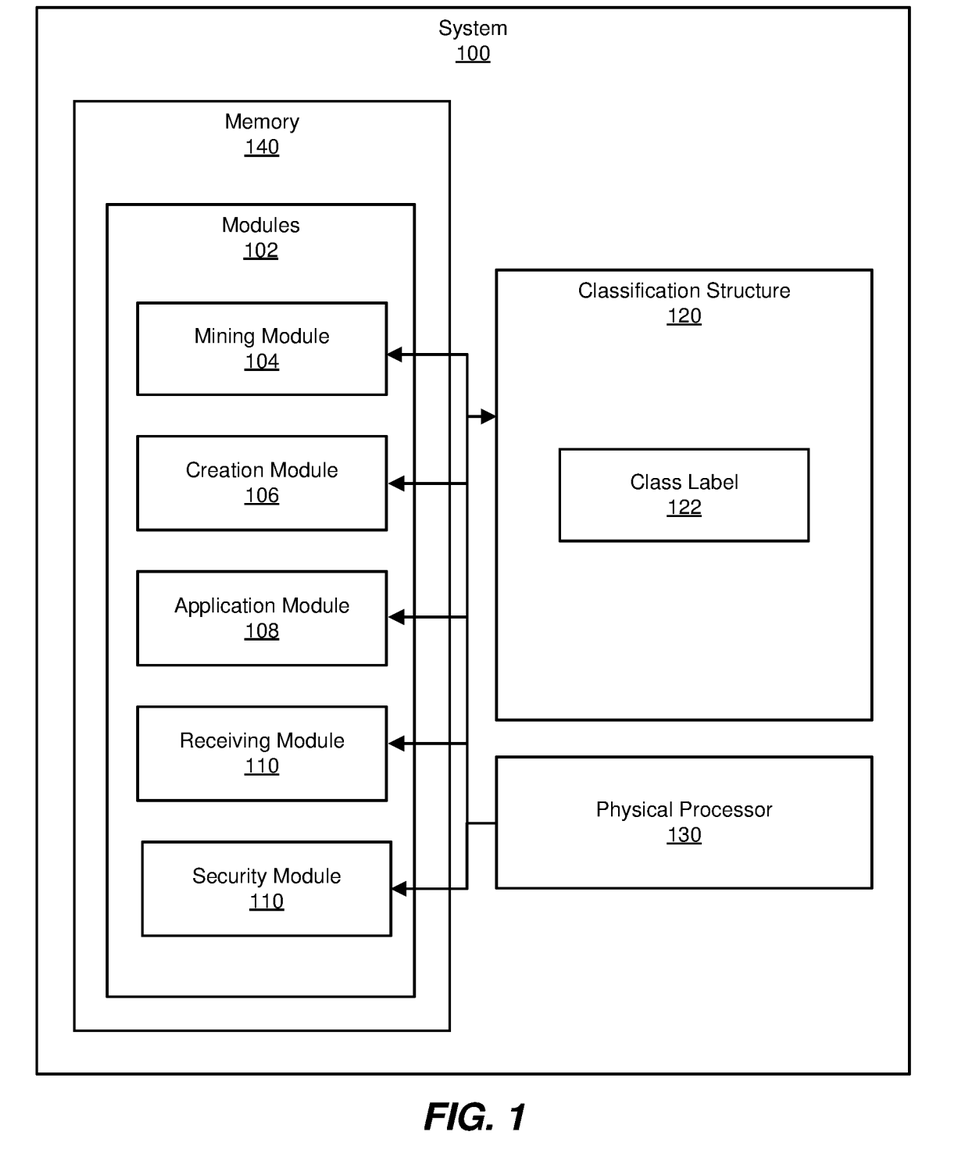
FIG. 1 is a block diagram of an example system for creating automatic computer-generated classifications.
Figure 2:
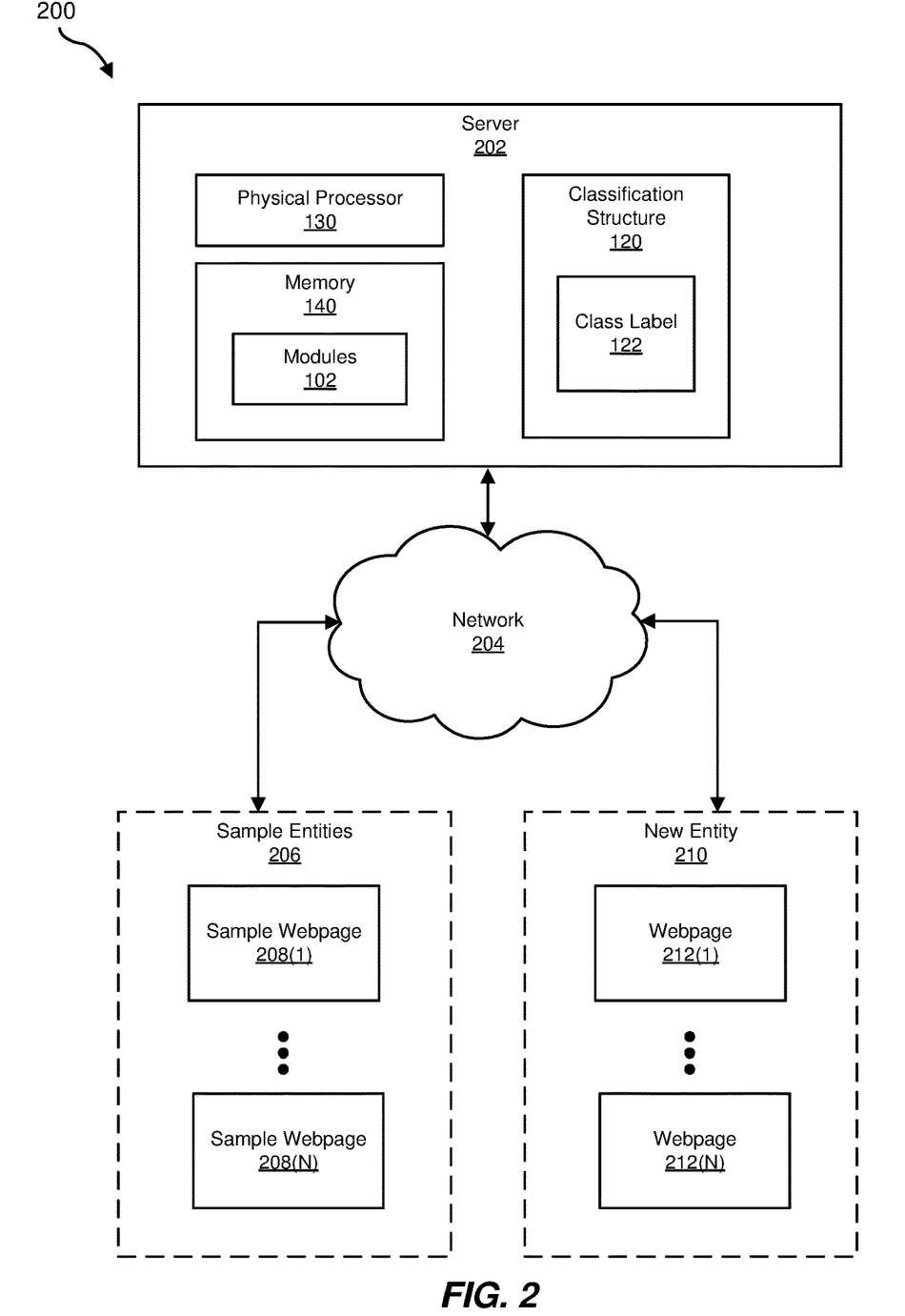
FIG. 2 is a block diagram of an additional example system for creating automatic computer-generated classifications.
Figure 3:
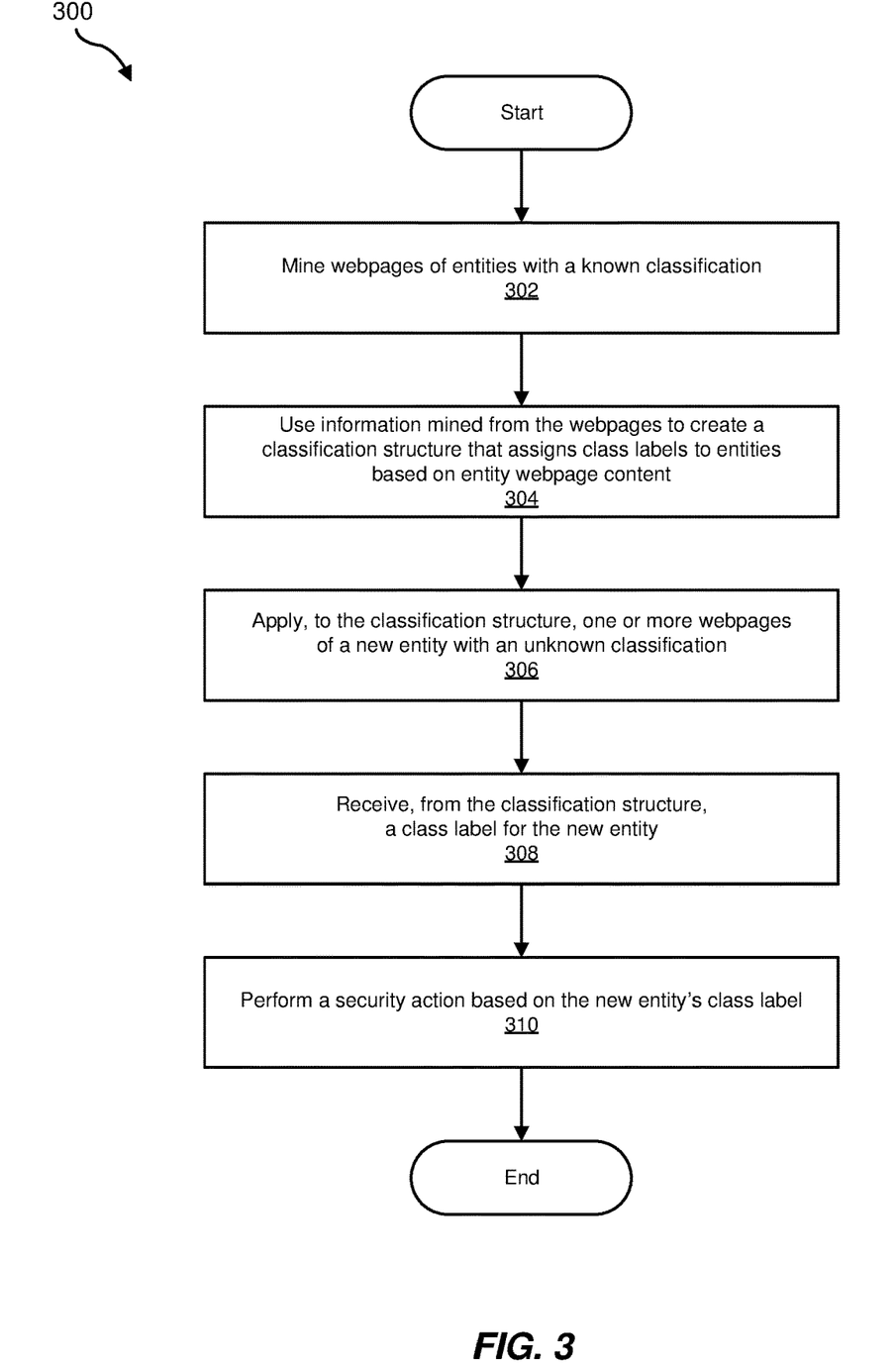
FIG. 3 is a flow diagram of an example method for creating automatic computer-generated classifications.
Figure 4:
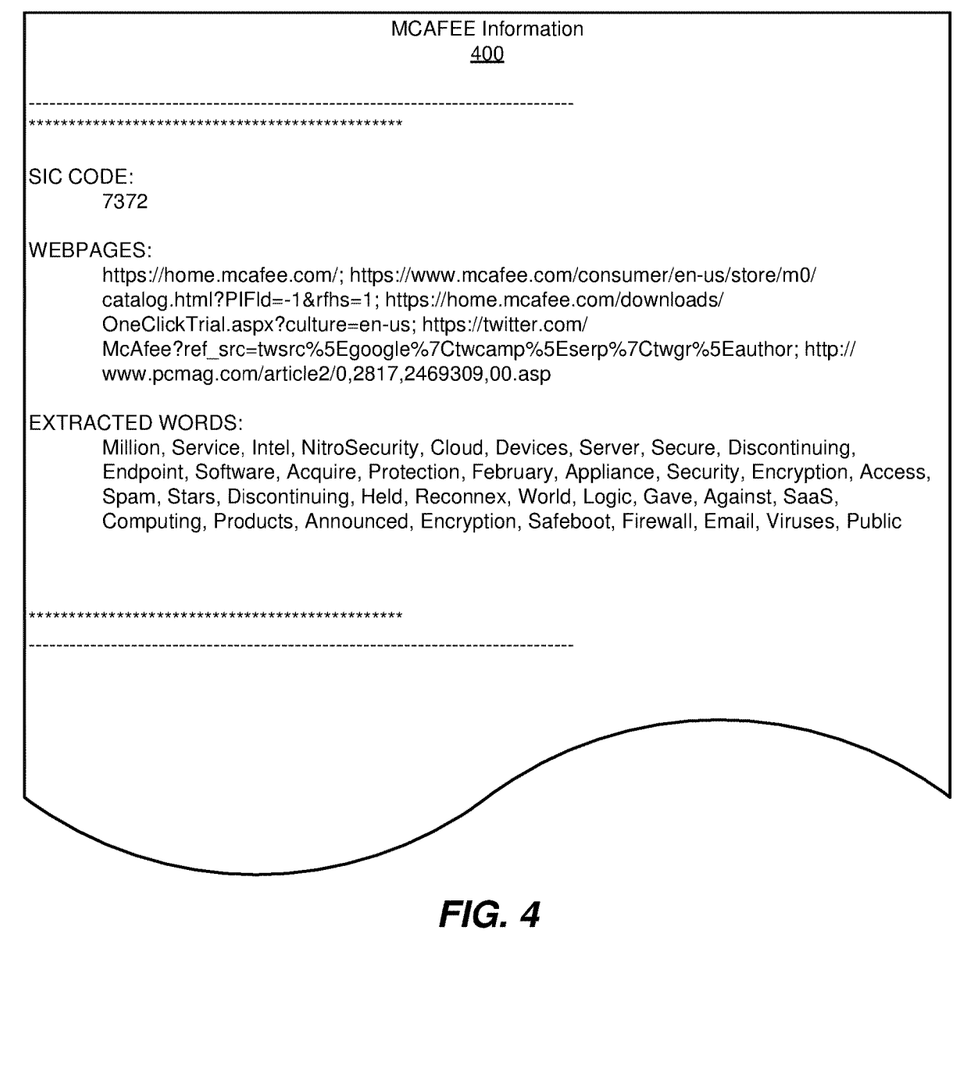
FIG. 4 is an exemplary block diagram of entity information.

The following will provide, with reference to FIGS. 1, 2, and 4, detailed descriptions of example systems for creating automatic computer-generated classifications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for creating automatic computer-generated classifications. As illustrated in this figure, exemplary system 100 may include one or more modules 102 for performing one or more tasks. For example, and as will be explained in greater detail below, exemplary system 100 may include a mining module 104 that mines webpages of entities with a known classification. Exemplary system 100 may additionally include a creation module 106 that uses information mined from the webpages to create a classification structure that assigns class labels to entities based on entity webpage content. Exemplary system 100 may also include an application module 108 that applies, to the classification structure, one or more webpages of a new entity with an unknown classification. Exemplary system 100 may additionally include a receiving module 110 that receives, from the classification structure, a class label for the new entity. Exemplary system 100 may also include a security module 112 that performs a security action based on the new entity's class label. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as server 202 illustrated in FIG. 2. One or more of modules 102 in FIG. 1 may also represent all or portions of one or more special-purpose computers configured to perform one or more tasks. In one embodiment, modules 102 may, collectively or individually, be embodied as circuitry that forms part of a larger system, for example, but not limited to, an integrated circuit (IC), a system on-chip (SoC), etc.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate creating automatic computer-generated classifications. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a classification structure 120. Classification structure 120 generally represents any type or form of data structure capable of assigning class labels (such as a class label 122) to entities. In some examples, classification structure 120 may rely on topic modeling to identify industry verticals and use lexical classification to assign new entities to an identified industry vertical. As used herein, a "topic model" generally refers to any type or form of probabilistic model that assigns a label (such as an industry vertical) to an entity (such as a company), given certain predictors associated with the entity (such as text from the company's web pages). In some examples, classification structure 120 may be capable of multi-class classification.

Example system 100 in FIG. 1 may be implemented in a variety of ways. For example, all or a portion of example system 100 may represent portions of example system 200 in FIG. 2. As shown in FIG. 2, system 200 may include a server 202 in communication with sample webpages 208(1)-(N) (associated with sample entities 206) and webpages 212(1)-(N) (associated with a new entity 210). All or a portion of the functionality of modules 102 may be performed by server 202 and/or any other suitable computing system.

As will be described in greater detail below, one or more of modules 102 from FIG. 1 may, when executed by at least one processor of server 202, enable server 202 to automatically create computer-generated classifications. For example, and as will be described in greater detail below, mining module 104 may mine sample webpages 208(1)-(N) of sample entities 206 with a known classification. Creation module 106 may use information mined from sample webpages 208(1)-(N) to create classification structure 120 that assigns class labels to entities based on entity webpage content. Application module 108 may apply, to classification structure 120, webpages 212(1)-(N) of a new entity 210 with an unknown classification. Receiving module 110 may receive, from the classification structure, class label 122 for new entity 210. Security module 112 may perform a security action based on class label 122.

Server 202 generally represents any type or form of computing device that is capable of assigning class labels and/or performing security actions based on class labels. Examples of server 202 include, without limitation, security servers, application servers, web servers, storage servers, and/or database servers configured to run certain software applications and/or provide various security, web, storage, and/or database services. Although illustrated as a single entity in FIG. 2, server 202 may include and/or represent a plurality of servers that work and/or operate in conjunction with one another.

Network 204 generally represents any medium or architecture capable of facilitating communication or data transfer. In one example, network 204 may facilitate communication between server 202 and sample webpages 208(1)-(N) and/or webpages 212(1)-(N). In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Sample webpages 208(1)-(N) and webpages 212(1)-(N) generally represent any type or form of documents (such as a hypertext document) that may be accessed using the World Wide Web. In some examples, sample webpages 208(1)-(N) and webpages 212(1)-(N) may represent publicly available webpages. In one embodiment, sample webpages 208(1)-(N) and webpages 212(1)-(N) may be associated with an entity (e.g., a corporation). In this embodiment, each webpage within sample webpages 208(1)-(N) may be associated with a sample entity (i.e., one of sample entities 206) that has a known classification. By contrast, each webpage within webpage 212(1)-(N) may be associated with a new entity (i.e., new entity 210) that does not have a known classification (or whose known classification needs to be verified).

In one example, sample webpages 208(1)-(N) and/or webpages 212(1)-(N) may include general information about an entity. In another example, sample webpages 208(1)-(N) and/or webpages 212(1)-(N) may be directed at marketing a product and/or service provided by an entity. Similarly, sample webpages 208(1)-(N) and/or webpages 212(1)-(N) may be directed at reviewing a product and/or service provided by an entity. In another example, sample webpages 208(1)-(N) and/or webpages 212(1)-(N) may represent social media pages. Specific examples of sample webpages 208(1)-(N) and/or webpages 212(1)-(N) may include, without limitation, an entity sponsored webpage, an entity WIKIPEDIA webpage, a SEC filing webpage, or an Enterprise Resource Planning (ERP) webpage.

FIG. 3 is a flow diagram of an example computer-implemented method 300 for creating automatic computer-generated classifications. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may mine webpages of entities with a known classification. For example, mining module 104 may, as part of server 202 in FIG. 2, mine sample webpages 208(1)-(N) of sample entities 206. As used herein, the phrase "data mining" generally refers to any type or form of computer-based process for analyzing large databases (e.g., databases of webpages) in order to glean useful information. In some examples, the size of the databases being analyzed may be so large that it would be infeasible for human analysts to manually perform the analysis.

In some examples, mining module 104 may mine sample webpages 208(1)-(N) by (i) searching for entities with a particular classification, (ii) identifying a corpus of webpages describing the entities with the particular classification (i.e., webpages 201(1)-(N)), and (iii) extracting the text within webpages 201(1)-(N) to glean useful information.

Mining module 104 may search for entities with a particular classification in a variety of ways. In some examples, mining module 104 may search publicly available databases of classified entities. For example, mining module 104 may search a U.S. Securities and Exchange Commission (SEC) database. In this example, the SEC database may include a list of entities that have filed with the SEC. The SEC databased may also include self-proclaimed classifications (e.g., Standard Industrial Classifications) for each entity within the list of entities. Using FIG. 4 as a specific example, mining module 104 may have queried an SEC database for entities categorized as providing prepackaged software services (i.e., SEC code 7372) and identified (e.g., along with thousands of other entities) the entity "MCAFEE." Additionally or alternatively, mining module 104 may receive input from a crowd-sourced list of entities that includes entity classifications (e.g., from a resource such as WIKIPEDIA).

Next, mining module 104 may identify a corpus of webpages in a variety of ways. In some examples, mining module 104 may rely on an Internet search engine. In these examples, mining module 104 may input search terms into the Internet search engine to receive a list of webpages associated with a particular entity. In one example, mining module 104 may rely on a web crawler to browse the Internet in an automated fashion. Using FIG. 4 as a specific example, mining module 104 may have identified webpages associated with the entity "MCAFEE" (e.g., https://home.mcafee.com/, https://www.mcafee.com/consumer/en-us/store/m0/catalog.html?PIFld=-1&rfhs=1, https://home.mcafee.com/downloads/OneClickTrial.aspx?culture=en-us, https://twitter.com/,McAfee?ref_src=twsrc %5Egoogle %7Ctwcamp %5Eserp %7Ctwgr %5Eautho, http://www.pcmag.com/article2/0,2817,2469309,00.asp).

Finally, mining module 104 may extract text from a corpus of webpages in a variety of ways. In some examples, mining module 104 may extract individual words. Using FIG. 4 as a specific example, mining module 104 may extract the words "Million, Service, Intel, NitroSecurity, Cloud, Devices, Server, Secure, Discontinuing, Endpoint, Software, Acquire, Protection, February, Appliance, Security, Encryption, Access, Spam, Stars, Discontinuing, Held, Reconnex, World, Logic, Gave, Against, SaaS, Computing, Products, Announced, Encryption, Safeboot, Firewall, Email, Viruses, and Public" from webpages associated with the entity "MCAFEE." Additionally or alternatively, mining module 104 may extract phrases. In another example, mining module 104 may identify semantic patterns (e.g., looking for word pairs, relative placement of words, etc.).

Returning to FIG. 3, at step 304, one or more of the systems described herein may use information mined from the webpages to create a classification structure that assigns class labels to entities based on entity webpage content. For example, creation module 106 may, as part of server 202 in FIG. 2, use information mined from sample webpages 208(1)-(N) to create classification structure 120 that assigns class labels to entities based on entity webpage content.

Creation module 106 may create classification structure 120 in a variety of ways. In some examples, creation module 106 may create classification structure 120 (i.e., a structure capable of assigning class labels to entities) by training classification structure 120 using machine learning. In one example, creation module 106 may train classification structure 120 using sample data from sample webpages 208(1)-(N) associated with sample entities 206 that have known class labels. In this example, creation module 106 may train classification structure 120 to identify an appropriate class label for new entities based on text included within webpages describing the new entities. Using FIG. 4 as a specific example, creation module 106 may train classification structure 120 to recognize that the text extracted from webpages associated with the entity MCAFEE (e.g., encryption, intel, service) is correlated with the class label "prepackaged software services." Additionally or alternatively, creation module 106 may train classification structure 120 using entity information from SEC filings.

In some examples, creation module 106 may train classification structure 120 to analyze text (e.g., the text included within webpages) using natural language processing. In one such embodiment, creation module 106 may train classification structure 120 using topic modeling. In this embodiment, classification structure 120 may identify hidden semantic structures within the text extracted by mining module 104. Then, based on the identified semantic structures, classification structure 120 may identify clusters of similar words corresponding to an abstract topic (e.g., a class label).

Returning to FIG. 3, at step 306, one or more of the systems described herein may apply, to the classification structure, one or more webpages of a new entity with an unknown classification. For example, application module 108 may, as part of server 202 in FIG. 2, apply, to classification structure 120, webpages 212(1)-(N) of new entity 210 with an unknown classification.

Application module 108 may apply webpages 212(1)-(N) to classification structure 120 in variety of ways. In some examples, application module 108 may (i) receive the name and/or trademark of new entity 210, (ii) search (e.g., via a search engine) for webpages 212(1)-(N) of new entity 210, and then (iii) apply webpages 212(1)-(N) to classification structure 120.

Application module 108 may receive the name and/or trademark of new entity 210 in a variety of contexts. In some examples, a service associated with server 202 may be attempting to identify an attribute of new entity 210 in order to provide a service for new entity 210. For example, server 202 may be managed by a security service providing (or preparing to provide) security services for new entity 210. In this example, application module 108 may apply webpages 212(1)-(N) to classification structure 120 in an attempt to determine a risk profile of new entity 210. In additional or alternative examples, a service associated with server 202 may be attempting to verify an existing industry classification for new entity 210.

In other examples, a service associated with server 202 may be attempting to gather industry-level aggregate statistics and/or characteristics. Examples of such statistics and/or characteristics may include, without limitation, spam, malware, phishing attacks, etc. In these examples, application module 108 may apply webpages 212(1)-(N) to classification structure 120 in an attempt to identify to which industrial sector new entity 210 belongs, in an attempt to gather aggregate statistics for that industrial sector.

At step 308, one or more of the systems described herein may receive, from the classification structure, a class label for the new entity. For example, receiving module 110 may, as part of server 202 in FIG. 2, receive, from classification structure 120, class label 122 for new entity 210. The term "class label" as used herein may refer to any type or form of category or attribute. In some examples, a class label may refer to an industry classification.

Classification structure 120 may generate class label 122 in a variety of ways. In some examples, classification structure 120 may generate class label 122 based on textual similarities between webpages 212(1)-(N) of new entity 210 and sample webpages 208(1)-(N) of sample entities 206. In these examples, classification structure 120 may determine that the text included within webpages 212(1)-(N) matches the text included within a certain subset of sample webpages 208(1)-(N) corresponding to sample entities that have class label 122. Based on this determination, classification structure 120 may assign class label 122 to new entity 210.

In some examples, classification structure 120 may generate a single class label (i.e., class label 122) for new entity 210. In other examples, classification structure 120 may generate multiple class labels, which include class label 122, for new entity 210. In these examples, classification structure 120 may generate the multiple class labels using fuzzy classification.

In some embodiments, receiving module 110 may attribute a particular characteristic to new entity 210 based on class label 122 received from classification structure 120. For example, receiving module 110 may determine that new entity 210 may be vulnerable to a particular type of security breach. In some examples, receiving module may determine that new entity 210 has a certain vulnerability based on vulnerability information available for other entities known to have class label 122.

In one embodiment, receiving module 110 may compare class label 122 received from classification structure 120 with a class label previously assigned to new entity 210 (e.g., a class label assigned by a new entity and/or a third party). If receiving module 110 determines that class label 122 differs from the previously assigned class label, receiving module 110 may determine that new entity 210 changed industry sectors after being assigned with the previously assigned class label. Thus, the disclosed systems and methods may, in one embodiment, enable automatic detection of an entity's change in industry section that does not rely on a human to manually identify the change.

At step 310, one or more of the systems described herein may perform a security action based on the new entity's class label. For example, security module 112 may, as part of server 202 in FIG. 2, perform a security action based on class label 122.

Security module 112 may perform a variety of types of actions. In some examples, the security action may include assigning a risk level to new entity 210. In these examples, security module 112 may assign a risk level based on an assumption that entities in a same industry share similar risk. For example, security module 112 may (i) determine a risk level of a certain subset of sample webpages 208(1)-(N) corresponding to sample entities with class label 122, and (ii) assign the determined risk level to new entity 210. In one example, the assigned risk level may be used to identity adequate safety precautions to implement for new entity 210. In another example, this risk level may be used to estimate insurance premiums for new entity 210.

In some examples, the security action may include implementing a security measure that responds to a vulnerability associated with class label 222. For example, the security action may include implementing a data loss protection measure.

As described above in connection with example method 300 in FIG. 3, the disclosed industry classification structure may use topic modeling to identify industry verticals (i.e., classes), and use lexical analysis to assign a new company to one (or more) industry verticals. In some examples, the disclosed systems and methods may first create a knowledge base for the industry classification structure using a training set of labeled data by mining a corpus of web pages for companies whose industry verticals are known. (SEC filings by public companies may serve as an ancillary source of labeled data). Then, the disclosed systems and methods may build a topic model of company descriptions for all the known industry verticals.

Figure 5:
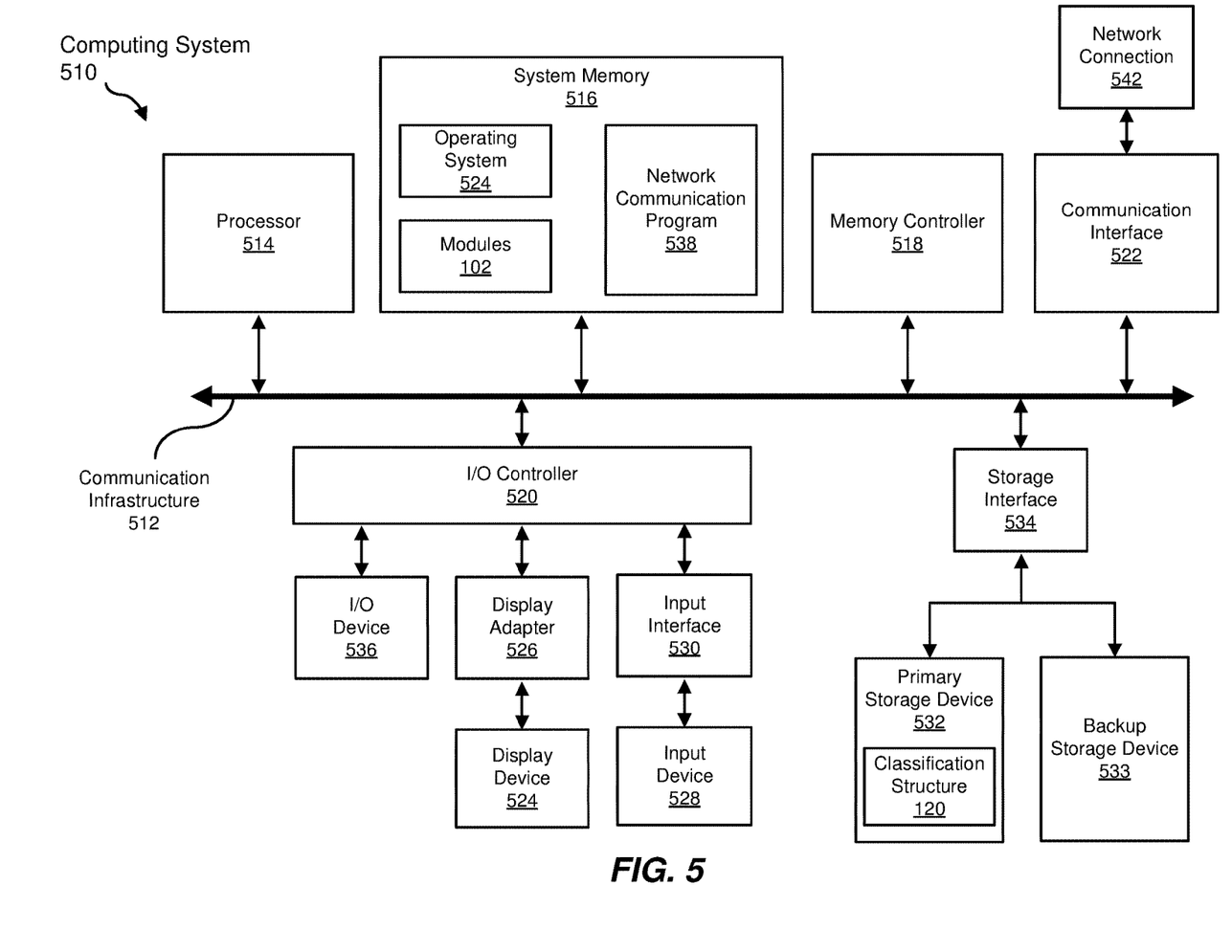
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, classification structure 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
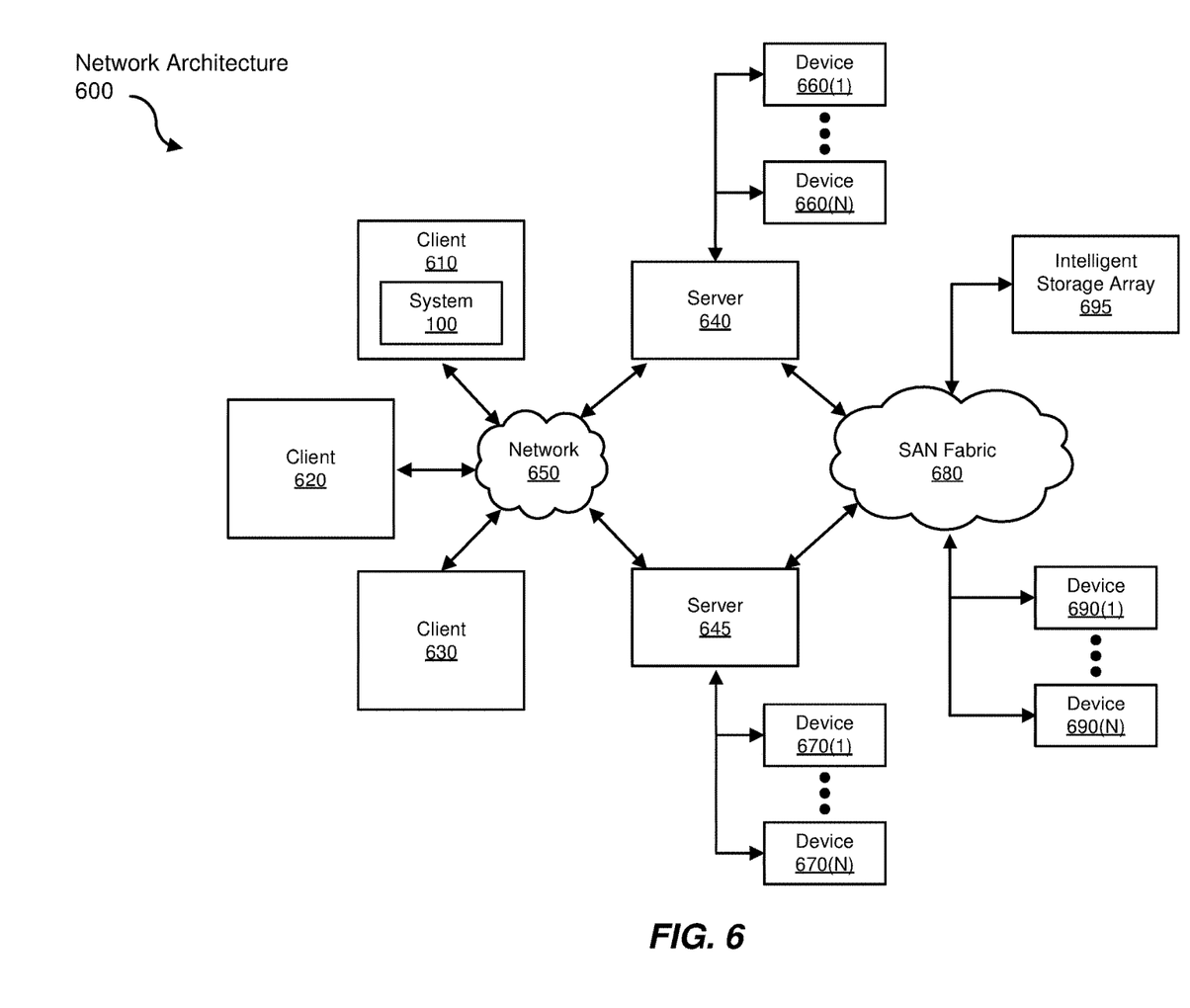
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for creating automatic computer-generated classifications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive labeled data (e.g., text from webpages), and transform the labeled data into a classification structure. Then, a classification output from the classification structure may be used select and perform a security action. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for creating automatic computer-generated classifications, at least a portion of the method being performed by a computing device comprising at least one processor, the method comprising:
    mining webpages of entities with a known industry classification by:
        searching a database of classified entities for entities that have a particular classification;
        identifying a corpus of webpages describing the entities with the particular classification; and
        extracting text from the identified webpages relating to the particular classification;
    using information mined from the webpages to create a classification structure that assigns industry classifications to entities based on entity webpage content;
    applying, to the classification structure, one or more webpages of a new entity with an unknown classification;
    receiving, from the classification structure, an industry classification for the new entity wherein the classification structure generates the industry classification by:
        identifying hidden semantic structures within the text extracted from the webpages of the entities with the particular classification;
        identifying, based on the identified hidden semantic structures, a cluster of similar words corresponding to an abstract topic; and
        determining that text included within the webpages of the new entity correspond to the cluster of similar words;
    deducing a vulnerability of the new entity based on vulnerability information available for other entities known to have the industry classification; and
    implementing a security measure that responds to the vulnerability associated with the industry classification.

2. The computer-implemented method of claim 1, further comprising:
    attributing a characteristic to the new entity based on the new entity's industry classification; and
    deducing the vulnerability based at least in part on the characteristic.

3. The computer-implemented method of claim 1, wherein implementing the security measure comprises performing at least one action to protect a device associated with the new entity against data loss.

4. The computer-implemented method of claim 3, wherein determining the vulnerability the new entity comprises determining the vulnerability of the new entity based further on risk information for the entities with known classifications.

5. The computer-implemented method of claim 1, wherein using the information mined from the webpages to create the classification structure comprises using textual semantics included within the webpages to create the classification structure.

6. The computer-implemented method of claim 5, wherein using the textual semantics included within the webpages comprises identifying semantic patterns within the webpages and using the semantic patterns to create the classification structure.

7. The computer-implemented method of claim 6, wherein the semantic patterns comprise at least one of:
    a word pair; and
    a relative placement of words.

8. The computer-implemented method of claim 1, wherein:
    the classification structure assigns the new entity with the multiple class labels using fuzzy classification; and
    receiving the new entity's industry classification from the classification structure comprising receiving multiple class labels for the new entity from the classification structure.

9. The computer-implemented method of claim 8, wherein mining the webpages of the entities with a known industry classification comprises:
    receiving input from a crowd-sourced list of entities that includes entity classifications; and
    identifying the industry classifications for the entities based on the input.

10. The computer-implemented method of claim 1, further comprising:
    identifying an industry classification previously assigned to the new entity by at least one of the new entity and a third party;
    determining that the industry classification previously assigned to the new entity differs from the industry classification received from the classification structure; and
    determining, based on the industry classification previously assigned to the new entity differing from the industry classification received from the classification structure, that the new entity changed industry sectors after receiving the previously assigned industry classification, wherein determining that the new entity changed industry sectors comprises automatically determining that the new entity changed industry sectors without obtaining information indicating that the new entity changed sectors from the new entity.

11. The computer-implemented method of claim 1, wherein mining the webpages of the entities with a known industry classification comprises identifying the webpages using at least one of:
    an Internet search engine; and
    a web crawler.

12. A system for creating automatic computer-generated classifications, the system comprising:
    a mining module, stored in memory, that mines webpages of entities with a known industry classification by:
        searching a database of classified entities for entities that have a particular classification;
        identifying a corpus of webpages describing the entities with the particular classification; and
        extracting text from the identified webpages relating to the particular classification;
    a creation module, stored in memory, that uses information mined from the webpages to create a classification structure that assigns industry classifications to entities based on entity webpage content;

an application module, stored in memory, that applies, to the classification structure, one or more webpages of a new entity with an unknown classification;
a receiving module, stored in memory, that receives, from the classification structure, an industry classification for the new entity, wherein the classification structure generates the industry classification by:
 identifying hidden semantic structures within the text extracted from the webpages of the entities with the particular classification;
 identifying, based on the identified hidden semantic structures, a cluster of similar words corresponding to an abstract topic; and
 determining that text included within the webpages of the new entity correspond to the cluster of similar words;
a security module, stored in memory, that deduces a vulnerability of the new entity based on vulnerability information available for other entities known to have the industry classification and implements a security measure that responds to the vulnerability associated with the industry classification; and
at least one physical processor configured to execute the mining module, the creation module, the application module, the receiving module, and the security module.

13. The system of claim 12, wherein:
the receiving module attributes a characteristic to the new entity based on the new entity's industry classification; and
the security module deduces the vulnerability based at least in part on the characteristic.

14. The system of claim 12, wherein the security module implements the security measure by performing at least one action to protect a device associated with the new entity against data loss.

15. The system of claim 14, wherein the security module determines the vulnerability of the new entity based further on risk information for the entities with known classifications.

16. The system of claim 12, wherein the webpages of the entities with a known classification and the webpages of the new entity comprise at least one of:
 webpages associated with an entity product;
 webpages associated with an entity service; and
 social media pages.

17. The system of claim 12, wherein the classification structure relies on topic modeling to assign industry classifications to entities.

18. A non-transitory computer-readable medium comprising one or more computer-readable instructions that, when executed by at least one processor of a computing device, cause the computing device to:
mine webpages of entities with a known industry classification by:
 searching a database of classified entities for entities that have a particular classification;
 identifying a corpus of webpages describing the entities with the particular classification; and
 extracting text from the identified webpages relating to the particular classification;
use information mined from the webpages to create a classification structure that assigns class industry classifications to entities based on entity webpage content;
apply, to the classification structure, one or more webpages of a new entity with an unknown classification;
receive, from the classification structure, an industry classification for the new entity, wherein the classification structure generates the industry classification by:
 identifying hidden semantic structures within the text extracted from the webpages of the entities with the particular classification;
 identifying, based on the identified hidden semantic structures, a cluster of similar words corresponding to an abstract topic; and
 determining that text included within the webpages of the new entity correspond to the cluster of similar words;
deduce a vulnerability of the new entity based on the new entity's industry classification based on vulnerability information available for other entities known to have the industry classification; and
implement a security measure that responds to the vulnerability associated with the industry classification.

19. The computer-implemented method of claim 1, wherein the vulnerability comprises a vulnerability to a particular type of security breach.

20. The system of claim 13, wherein the vulnerability comprises a vulnerability to a particular type of security breach.

* * * * *